United States Patent [19]

Mecsey

[11] 4,355,557
[45] Oct. 26, 1982

[54] APPARATUS FOR SAWING A WOOD PIECE IN CONFORMANCE WITH A TEMPLATE CONFIGURATION

[76] Inventor: Michael A. Mecsey, 2323 S. Butte Ave., Tempe, Ariz. 85282

[21] Appl. No.: 99,603

[22] Filed: Dec. 3, 1979

Related U.S. Application Data

[63] Continuation-in-part of Ser. No. 947,354, Oct. 2, 1978, abandoned.

[51] Int. Cl.³ .............................................. B27B 11/04
[52] U.S. Cl. ........................................ 83/565; 83/758; 83/574; 83/746; 83/581; 144/144 R; 30/392
[58] Field of Search ................. 83/758, 565, 746, 747, 83/753, 781, 574, 581; 144/144 R; 30/392

[56] References Cited

U.S. PATENT DOCUMENTS

| | | | |
|---|---|---|---|
| 2,599,893 | 6/1952 | Butler | 83/464 |
| 3,146,812 | 9/1964 | Fleischer | 144/144 R |
| 3,289,716 | 12/1966 | Dutot | 144/144 R |
| 3,410,324 | 11/1968 | Thompson | 83/441.1 |
| 3,442,309 | 5/1969 | Jentsch | 144/144 R |
| 3,642,038 | 2/1972 | Mannes | 30/392 |

Primary Examiner—Donald R. Schran
Attorney, Agent, or Firm—Gregory J. Nelson

[57] ABSTRACT

A sawing device for translating the shape on a template to an accompanying sawing blade which gauges the workpiece to cut the workpiece in the desired shape and includes a table which detachably supports a pattern or template. The template is securable at one edge of the table surface. A track is supported at opposite edges of the table in a carriage assembly. The carriage assembly permits the entire track assembly to be moved in the X-X axis or longitudinally along the table. The carriage comprises a cylindrical sleeve secured to the end of the track which receives a longitudinal rod mounted to the table by appropriate brackets. The track defines a groove and supports a motor. The motor has a lip engaging the groove so the motor may be moved in the Y-Y axis or transversely of the table. The motor drives a vibrating or oscillatory blade which depends from the motor through the slot. The guide member also depends from the motor and is received in a groove in the subjacent template. Thus, the motor and blade can be moved along the template and the corresponding movement is imparted to the blade at the workpiece to saw the workpiece.

4 Claims, 17 Drawing Figures

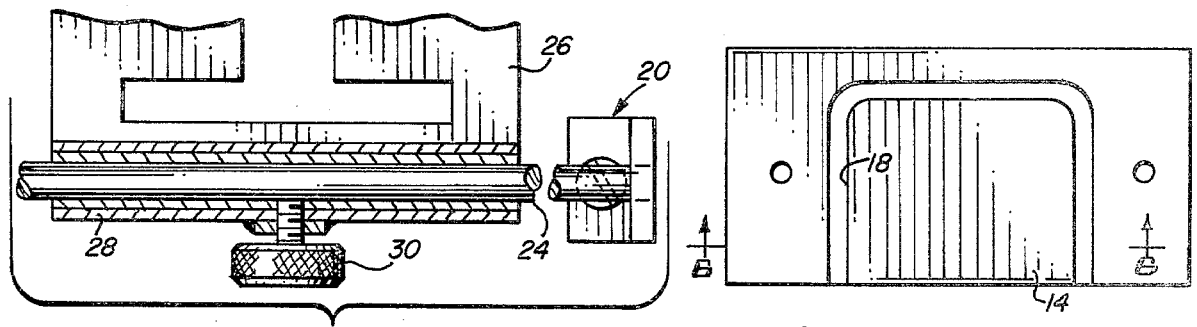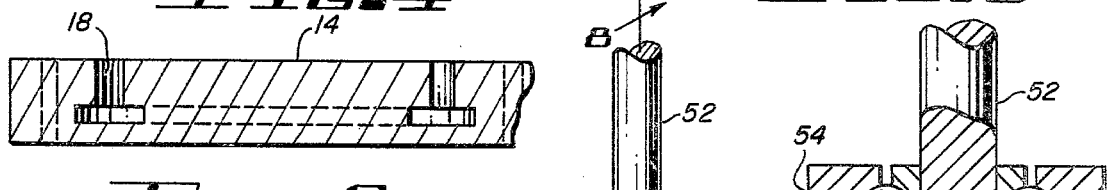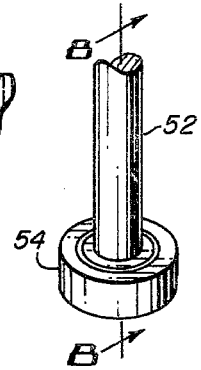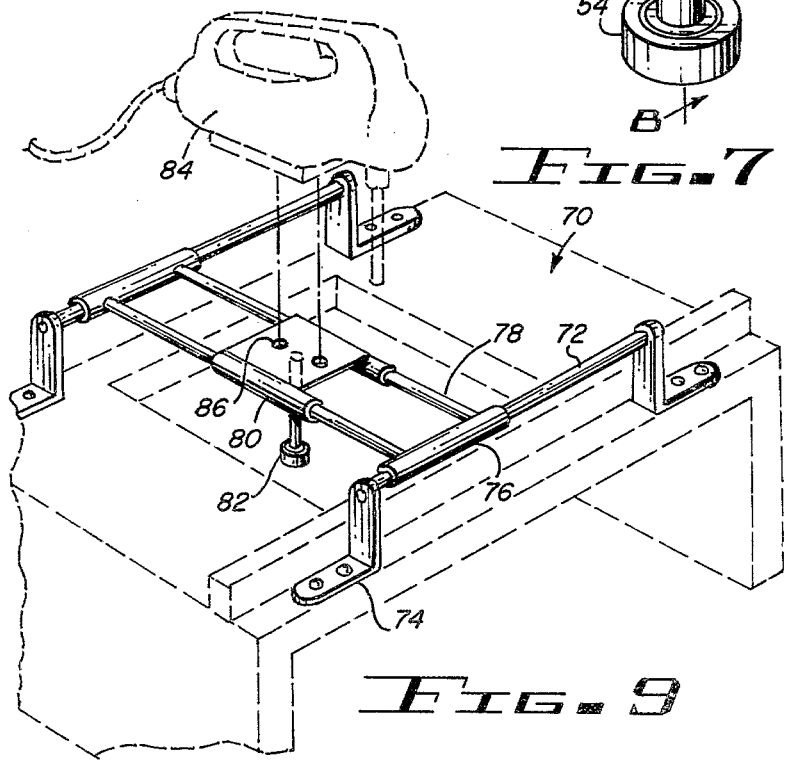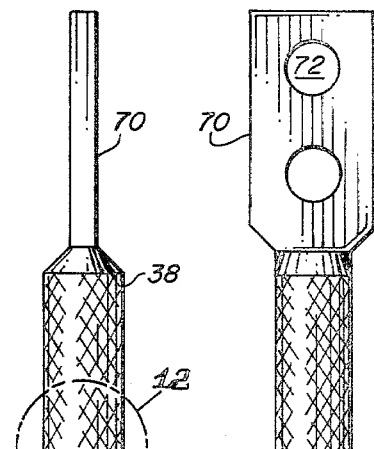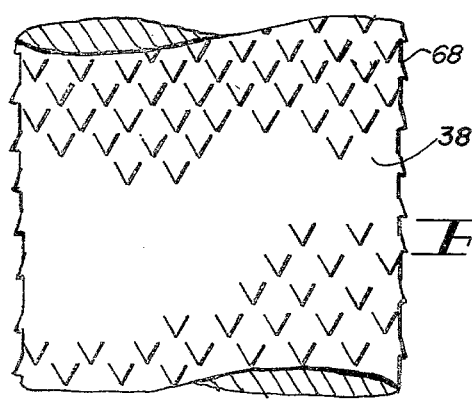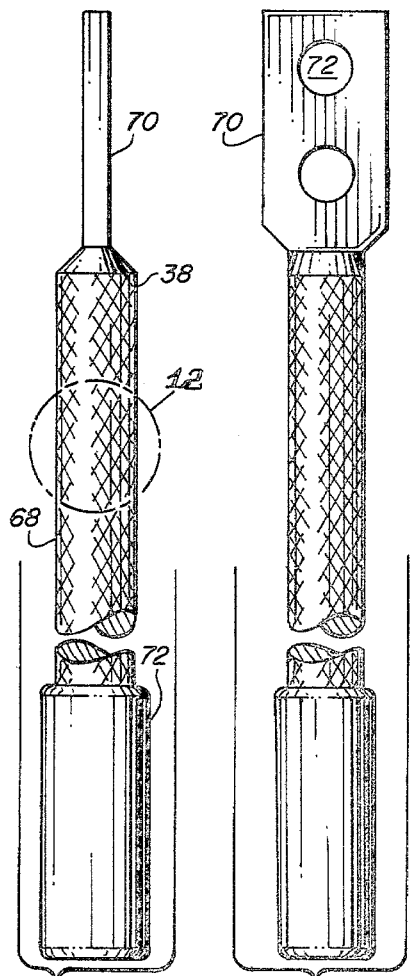

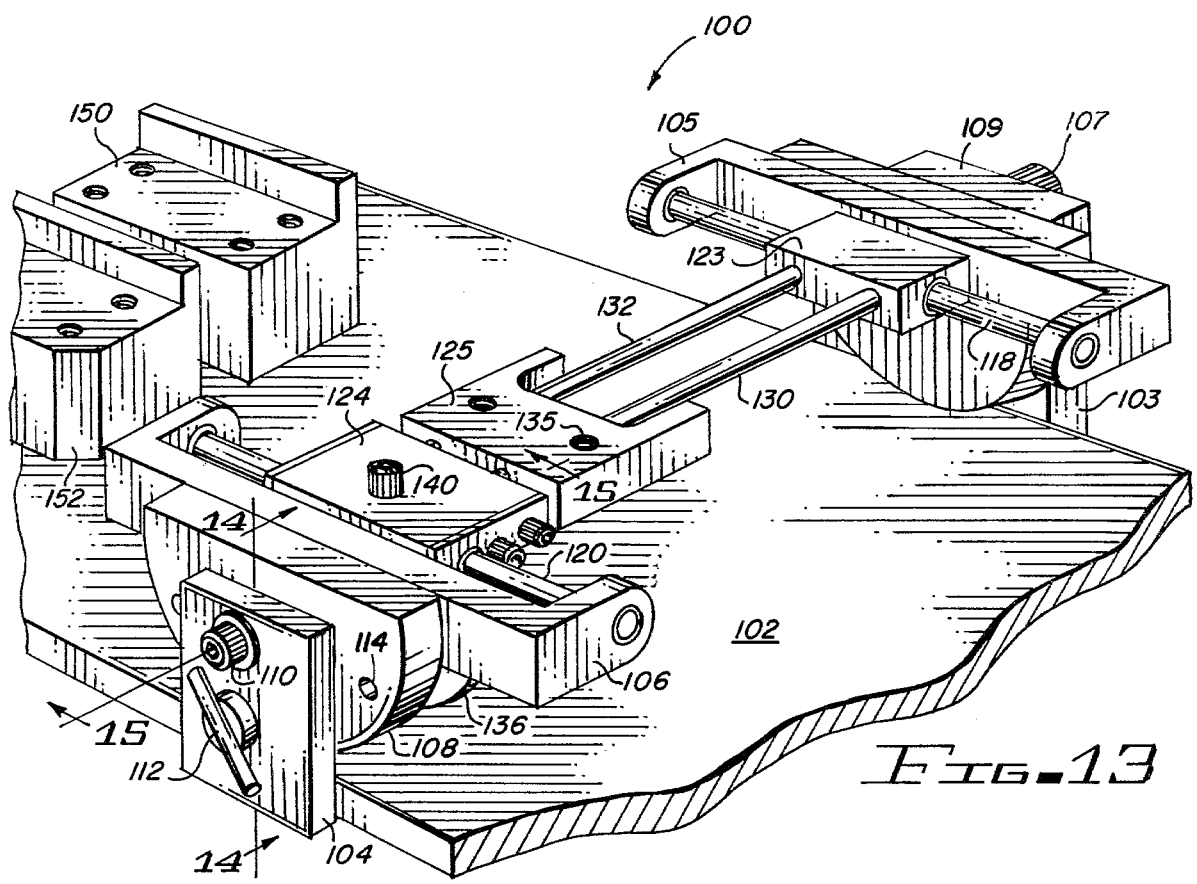
Fig-13
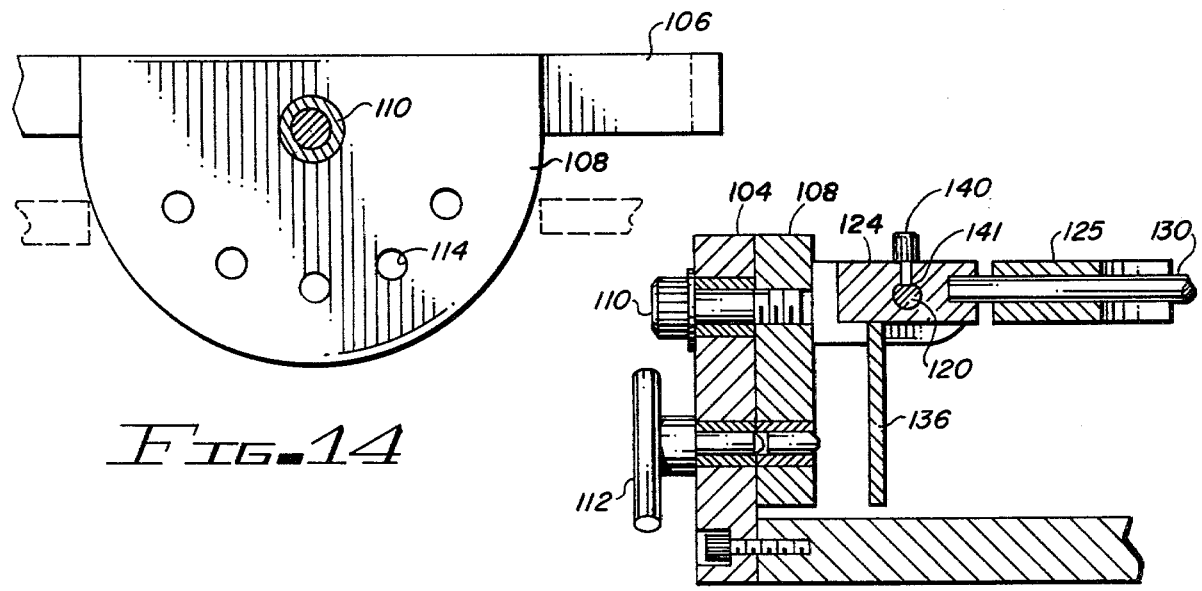
Fig-14
Fig-15

APPARATUS FOR SAWING A WOOD PIECE IN CONFORMANCE WITH A TEMPLATE CONFIGURATION

CROSS REFERENCE TO RELATED APPLICATION

This application is a continuation-in-part of my co-pending application, Ser. No. 947,354 filed Oct. 2, 1978, now abandoned.

FIELD OF THE INVENTION

The present invention relates to a motion-translating device. More particularly, the present invention relates to a sawing device for sawing a wooden workpiece according to a design traced in a template.

BACKGROUND OF THE INVENTION

In the manufacture of cabinets and furniture and in the production of homes, it is often necessary to fit moldings and other trim strips together to form an "inside" corner. One of the abutting moldings or trim strips must be shaped in the contour of the molding for a neatly appearing fit. Generally, the workman must do this by a manual operation tracing the outline of the molding on the workpiece to be trimmed. The material is then cut away manually. Obviously, this is a time-consuming and imprecise procedure. The resulting fit will depend largely on the skill of the workman.

SUMMARY OF THE INVENTION

Briefly, the present invention relates to a sawing device for translating the shape on a template to an accompanying sawing blade which gauges the workpiece to cut the workpiece in the desired shape. The present invention includes a table which detachably supports a pattern or template. Preferably, the template is securable at one edge of the table surface. A track is supported at opposite edges of the table in a carriage assembly. The carriage assembly permits the entire track assembly to be moved in the X-X axis or longitudinally along the table. In one form of the invention, the carriage comprises a cylindrical sleeve secured to the end of the track which receives a longitudinal rod mounted to the table by appropriate brackets.

The track defines a groove and supports a motor. The motor has a lip engaging the groove so the motor may be moved in the Y-Y axis or transversely of the table. The motor drives a vibrating or oscillatory blade which depends from the motor through the slot. The guide member also depends from the motor and is received in a groove in the subjacent template. Thus, the motor and blade can be moved along the template and the corresponding movement is imparted to the blade at the workpiece to saw the workpiece.

In another form of the invention, the carriage and track assembly can be provided as a separate assembly to accommodate conventional jigsaws.

DESCRIPTION OF THE DRAWINGS

The above and other objects, features and advantages of the present invention become apparent from the following with reference to the accompanying drawings in which:

FIG. 4 is a detailed view of the normal end of the track assembly and a portion of the carriage assembly;

FIG. 5 is a plan view of a typical template;

FIG. 6 is a sectional view taken along lines 6-6 of FIG. 5;

FIG. 7 is a detailed view of the end of the follower or guide shaft;

FIG. 8 is an enlarged view, partly in section, of the end section of the shaft shown in FIG. 7;

FIG. 9 is a perspective view of another embodiment of the present invention adapted to accommodate a conventional jigsaw;

FIGS. 10 and 11 illustrate saw blades which may be used with the present invention;

FIG. 12 is an enlarged detail view of a portion of the saw blade as indicated in FIG. 10;

FIG. 13 is a perspective view of an alternate embodiment of the present invention;

FIG. 14 is a sectional view taken along lines 14-14 of FIG. 13;

FIG. 15 is a sectional view taken along lines 15-15 of FIG. 13;

Figure 1:
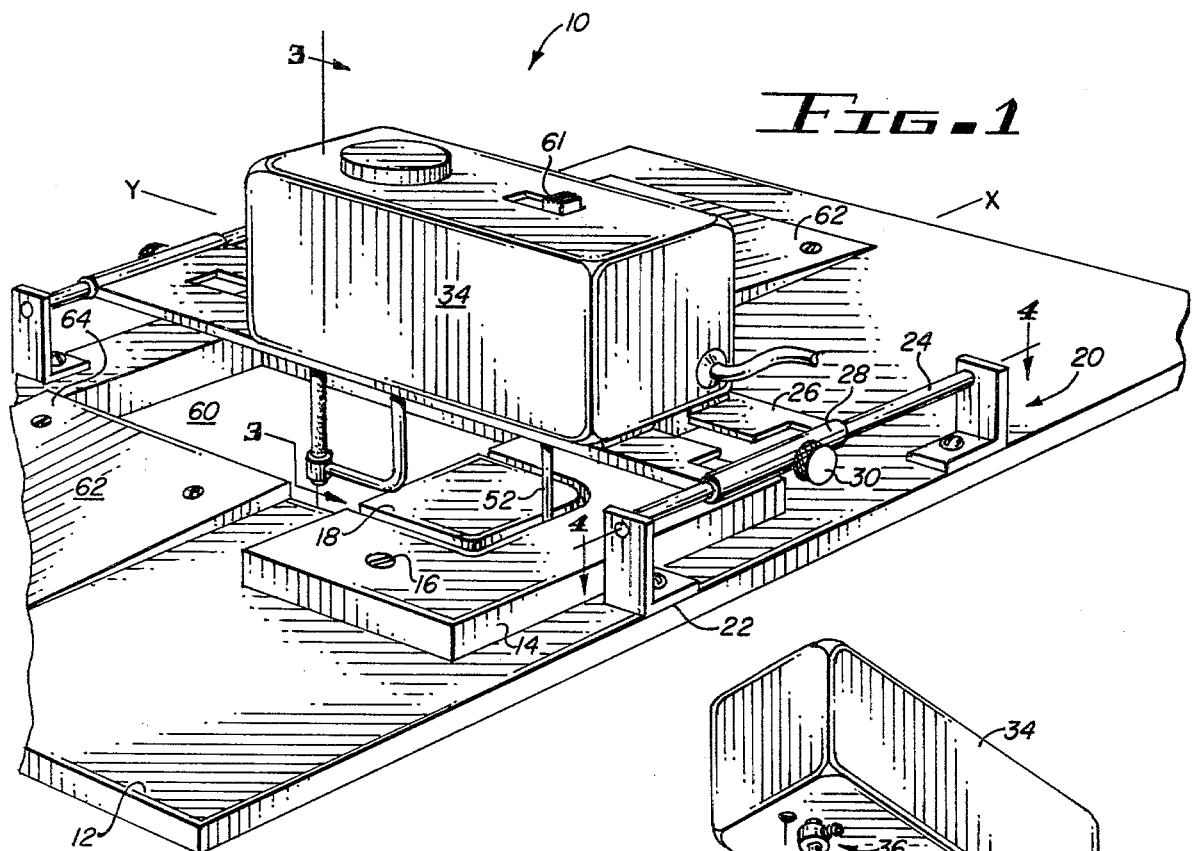
FIG. 1 is a perspective view of the sawing device of the present invention.
Figure 3:
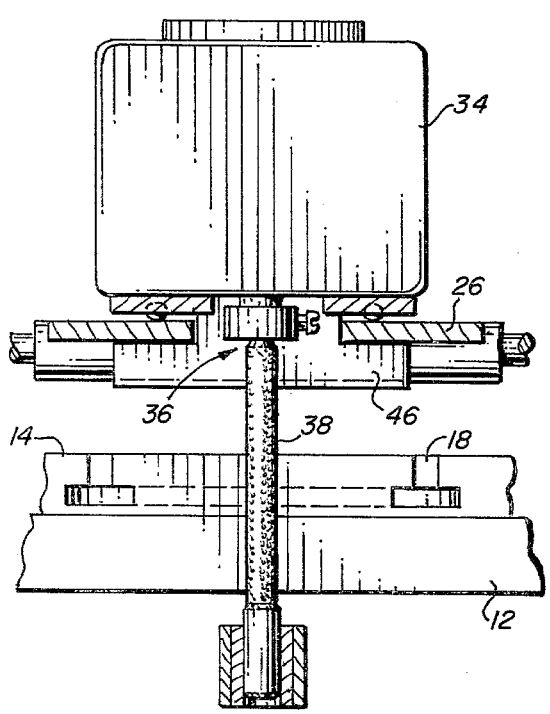
FIG. 3 is a sectional view taken along lines 3-3 of FIG. 1.

The apparatus of the present invention may be mounted on any convenient surface such as a generally horizontal table 12 having a longitudinal or X-X axis and a transverse or Y-Y dimension. As best seen in FIG. 1, the pattern or template 14 is detachably secured to table 12 by fasteners 16 which are shown as screws depending through the template 14 into the table 12. The template defines a slot 18 which is contoured in accordance with the desired shape to be imparted to the workpiece. The slot 18 actually comprises the shape to be imparted to the workpiece and the mirror image of that shape so that a workpiece can be fed from either side of the saw as will be fully explained hereafter. The template 14 can be changed in accordance with the workpiece requirements.

The carriage assembly generally designated by the numeral 20 is secured adjacent the opposite lateral edges of table 12. The carriage assembly includes two spaced apart L-shaped brackets 22 which support longitudinal rod 24 above the surface of table 12. Transverse track 26 extends laterally between the opposed carriages 20, terminating a sleeves 28 at either end of the track. Sleeves 28 are slidable along rods 24 at opposite sides of the table 12. A set screw 30 extends through the wall of each of the sleeves 28 to lock the sleeves 28 with respect to carriage rods 24.

Figure 2:
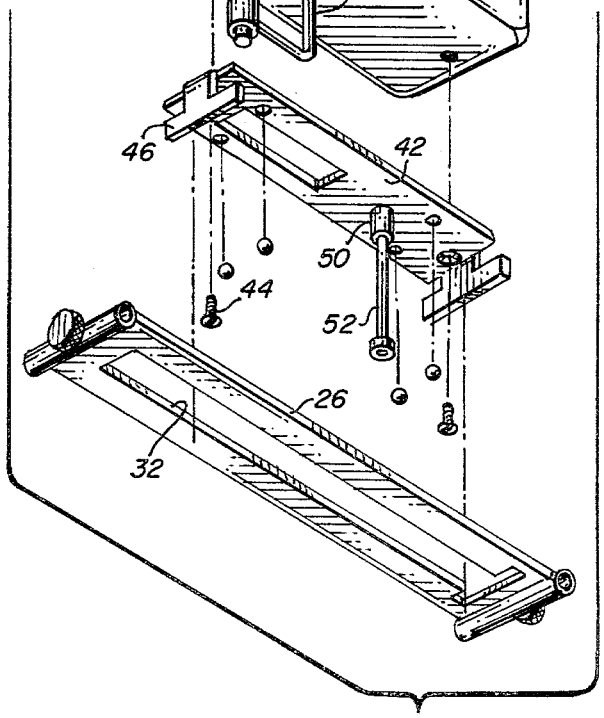
FIG. 2 is an exploded perspective view illustrating the motor and track assembly.

Track 26 is best seen in FIG. 2 and defines a transverse slot 32. Tool 34 is supported on track 32. Tool 34 is shown as a saw having a chuck 36 for driving a saw blade 38 in an appropriate oscillatory or reciprocatory motion. A saw blade guide 40 is provided to maintain the saw blade 38 in a given vertical path of movement. Support plate 42 is secured to the underside of the tool 34 by appropriate fasteners 44. The plate 42 includes a pair of generally T-shaped members 46 at either end which engage slot 32 in track 26. The support plate 42 also carries a depending boss 50 which receives an elongate follower rod 52. Follower rod 52 is best shown in FIGS. 7 and 8 and terminates at the rotary bearing 54 which is adapted to be received within the slot 18 in the template 14.

The work area is generally shown by the numeral 60. At opposite sides of the work area 60 are opposed ramps 62 which are slightly upwardly inclined. An abutment 64 is provided at the edge of the work area so the workpiece can be engaged against the abutment.

A more complete understanding of the present invention will be understood from the following description of operation. An appropriate workpiece, such as a trim molding having an appropriate ornamental shape, is selected. Template 14 having a pattern slot 18 conforming to the shape of the molding selected is secured to the table 12 by fasteners 16. As pointed out above, the slot 18 actually conforms to the outline of the molding surface and a mirror image of that configuration. The slot 18 is preferably undercut to receive the bearing member 54 at the lower end of follower shaft 52. The workpiece is placed on feed ramp 62 against abutment 64. The workpiece may be placed in the work area from either the left or right side of the work area as viewed in FIG. 1. The tool 34 is actuated at switch 60 and blade 38 is driven in a reciprocating or oscillatory motion. The follower shaft is moved along the template guide 18. The movement of the follower shaft 52 is also imparted to the blade 38. The carriage assemblies 20 permit the follower to move in the longitudinal or X-X axis. Track 26 permits the follower to move in the transverse or X-X axis. Movement in the X-X axis may be restrained by set screw 30. Once the follower has moved along the guide slot through the appropriate portion, the movement is imparted to the saw blade and the workpiece cut in the appropriate shape. If another shape is desired to be imparted to the workpiece, the template 14 can be removed and replaced with another template.

The saw blade 38 is shown in FIGS. 10 to 12. Saw blade has a generally cylindrical body 68. A flat shank 70 is secured at the upper end of the body 68. A lower cylindrical bearing portion 72 is provided at the lower end of body 68 and is adapted to be received within the saw blade guide 40. The shank portion 70 may be defined in one or more apertures 72 which are adapted to receive the appropriate set screw at the chuck or collar 36. The body 68 is provided with a plurality of rows of helically arranged projections 70. Preferably, the projections are fine and closely spaced to give a clean cut. The blade may be made of any simple material such as a high quality carbon steel. In another form of the blade, the projections may be carbide bits carried on shaft or body.

A modified form of the present invention is shown in FIG. 9 and is generally designated by the numeral 70. The components of embodiment 70 are generally the same as those described with reference to previous figures and include opposite carriage members 72 having mounting brackets 74. Transversely extending between carriage sleeve members 76 are a pair of elongate rods 78. Elongate rods 78 slidably carry a mounting plate 80. Mounting plate 80 defines several apertures or holes 86 for receipt of fasteners which can be secured to a conventional device such as jigsaw 84 shown in dotted. A follower 82 depends from plate 80 and is cooperable with the template and has been described above.

The embodiment 70, shown in FIG. 9, is adapted to be supplied to the user and the user can furnish an appropriate tool such as jigsaw 84. In other respects, the apparatus of embodiment 70 operates in a manner similar to that described with references to previous figures.

An alternate embodiment of the present invention is shown in FIGS. 13 through 17 and is generally designated by the numeral 100. Embodiment of 100 is generally as has been described with previous figures but further includes provision of means to permit the table to be rotated about a transverse axis to impart an angular cut to the workpiece. Embodiment 100 includes a base plate 102 which has upstanding supports 103 and 104 located at opposite sides of the base plate 102. A generally C-shaped bracket 105 is pivotally secured to pivot plate 109 carried on support 103 at pivot shaft 107. Similarly, C bracket 106 is secured to pivot plate 108 which is pivotally secured to support 104 about pivot axis 110.

Detent 112 in support 104 cooperates with a plurality of circumferentially spaced holes 114 in plate 108 to allow the assembly to be pivoted to selected angular positions as will be explained.

Bearing block 123 is longitudinally slidable along rod 118 supported on C-bracket 105. Similarly block 124 is slidable along longitudinally extending rod 120 supported at C-bracket 106. Transverse rods 130 and 132 extend between bearing block 120 and 124. Table 125 is transversely slidable along rods 130 and 132. A router, saw or other cutting tool can be secured to table 125 at tapped holes 135. Detent 140 can be selectively engaged in slot 141 of shaft 120 to secure the block against movement. Semi-circular follower 136 depends from block 124.

Figure 16:
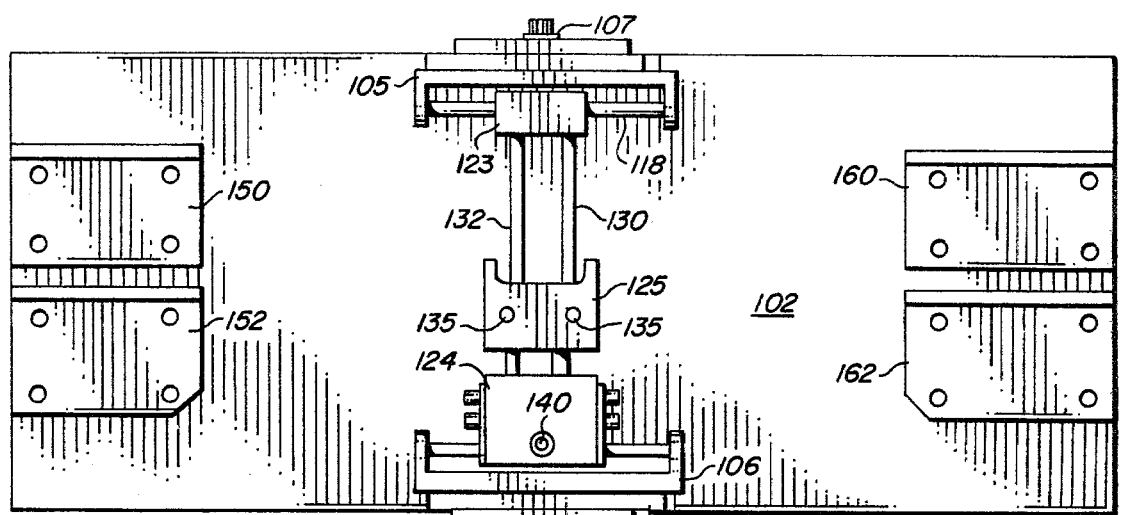
FIG. 16 is a plan view of the saw device of Fig. 13.
Figure 17:
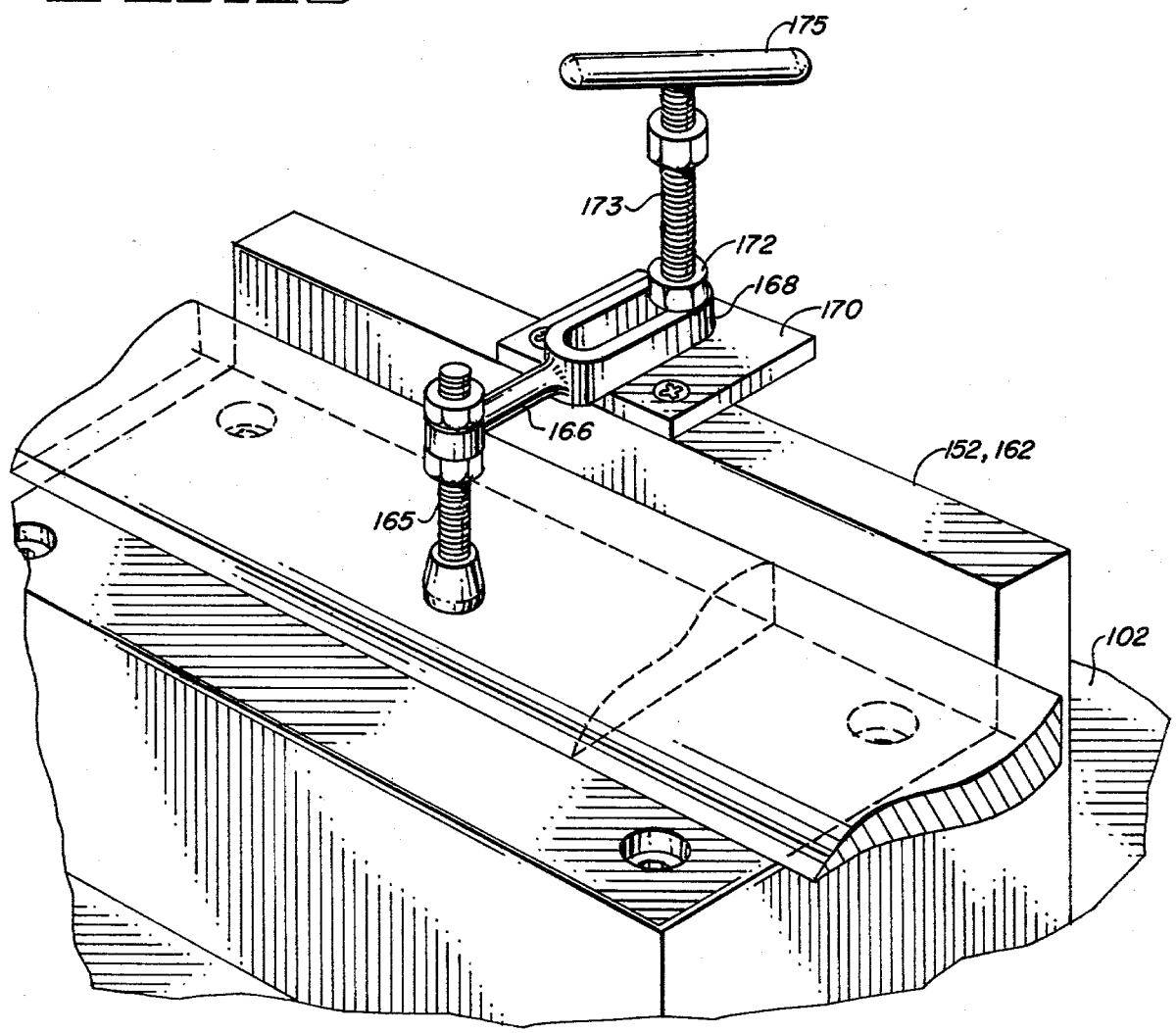
FIG. 17 is a detailed view of a workpiece holder illustrated in FIGS. 13 and 16.

Workpiece holders 150 and 152 are positioned on base 102 to the left of the table as viewed in FIG. 16. Similarly, workpiece holders 160 and 162 are positioned to the right of table 135 as viewed in FIG. 16. A clamp assembly 175 as best seen in FIG. 17, may be associated with workpiece holders 150, 152, 160 and 162. The clamp comprises a foot 165 which is in threaded engagement with generally horizontal shaft 166. Shaft 166 carries an elongate slot 168 which is adjustably secured to plate 170. Nut 172 is carried on threaded shaft 173. Shaft 173 may be rotated at handle 175 to position and tighten the clamp against a workpiece or pattern as shown in dotted in FIG. 17.

The use of the device 100 substantially has been described above. A router, saw or other cutting member may be positioned on table 125. X-Y motion is accommodated at either the longitudinal or transversely extending rods. Further, pivotal movement about shafts 107 and 110 along an axis transversely extending across the base 102 is accomplished by removing detent 112 from the holes 114 in member 108 and rotating the entire table to a desired angular position and locking the table in that position by engaging the detent in the appropriate hole 114. The workpiece can be engaged in one of the alignment members 150 or 160 depending on the nature of the cut to be made. If a template or pattern is to be followed, the appropriate template can be secured in one of the members 152 or 162 and secured in place by the clamp member 164. The template is traced by follower 136 in both the transverse and longitudinal directions regardless of the angularity of the table.

Having thus described the present invention, it will be understood by those familiar with the art that the various changes, modifications and alterations can be made to the present invention without departing from the spirit and scope of the appended claims.

I claim:

1. An apparatus for cutting a work piece in a configuration conforming to a predetermined shape comprising:
   (a) a base defining a work area;
   (b) a pair of supports oppositely disposed at opposite lateral sides of said work area;
   (c) brackets pivotally secured at said supports and adapted to pivot about an axis extending transversely of said work area, said brackets each carrying a longitudinally extending rail member;
   (d) block means longitudinally slideable at each of said rail members having rod means extending transversely across said work area therebetween;
   (e) table means transversely slideable along said rod means adapted to receive a cutting member having a depending blade and a depending follower means; and
   (f) work piece holder means disposed at either longitudinal side of said work area and template holder means disposed at either longitudinal side of said work area, said template holder means adapted to detachably secure a template thereto whereby movement of the follower means along said template is translated to corresponding motion to said blade at the work area whereby said entire table and attached blade member can be rotated about a transverse axis for imparting angular cuts.

2. The apparatus of claim 1 wherein said blade is generally cylindrical having projections extending therefrom.

3. The apparatus of claim 1 further including detent means for securing said carriage in a predetermined angular position.

4. The apparatus of claim 3 wherein said follower comprises has a generally semi-circular edge for tracing a pattern.

* * * * *